US012630362B1

(12) United States Patent
Somavar Muniappan et al.

(10) Patent No.: US 12,630,362 B1
(45) Date of Patent: May 19, 2026

(54) SYSTEMS AND METHODS FOR CALIBRATION OF A SHUTTLE SORTATION SYSTEM

(71) Applicant: Amazon Technologies, Inc., Seattle, WA (US)

(72) Inventors: Vinodhkumar Somavar Muniappan, Redmond, WA (US); Vivek S Narayanan, Franklin, TN (US); Dylan Andrew Norris, Redmond, WA (US); Ganesh Krishnamoorthy, Seattle, WA (US); Michael Alan Bray, Elkhorn, NE (US); Ryan Slaughter, Edmonds, WA (US); Gurjinder Singh Dhami, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 517 days.

(21) Appl. No.: 18/344,523

(22) Filed: Jun. 29, 2023

(51) Int. Cl.
　　*B65G 1/04* (2006.01)
　　*B65G 1/02* (2006.01)

(52) U.S. Cl.
　　CPC ........... *B65G 1/0485* (2013.01); *B65G 1/023* (2013.01); *B65G 2203/041* (2013.01)

(58) Field of Classification Search
　　None
　　See application file for complete search history.

(56) References Cited

U.S. PATENT DOCUMENTS

| | | | |
|---|---|---|---|
| 11,945,665 B1 * | 4/2024 | Lais | B65G 54/02 |
| 2020/0223630 A1 * | 7/2020 | Fosnight | B65G 1/0464 |

* cited by examiner

*Primary Examiner* — Mark R Milia
(74) *Attorney, Agent, or Firm* — Eversheds Sutherland (US) LLP

(57) ABSTRACT

Systems and methods are disclosed for a shuttle sortation system having a calibration shuttle for determining and adjusting shuttle coordinates for depositing items and/or loading totes at various tote receiving areas. The shuttle sortation system may include item tracks and tote tracks for sorting and/or distributing items, packages, and/or totes, and may move the shuttles about the shuttle sortation system via linear synchronous motors (LSMs). The calibration shuttle may include a base portion designed to interface with the track (e.g., with the LSMs). The base may support imaging systems having cameras and processors for capturing images of the tote receiving areas and processing the images to determine a centerline of such tote receiving areas and adjusting coordinates used to navigate the shuttle to the tote receiving areas. The calibration shuttle may be navigated to each tote receiving area to adjust coordinates where an offset from the centerline is detected.

20 Claims, 10 Drawing Sheets

| Slot | Offset | Coordinates | Updated Coor. |
|------|--------|-------------|---------------|
| A1 | 0.05 | 10.00 | 10.05 |
| A2 | 0.04 | 13.00 | 13.09 |
| A2 | -0.01 | 16.00 | 16.08 |

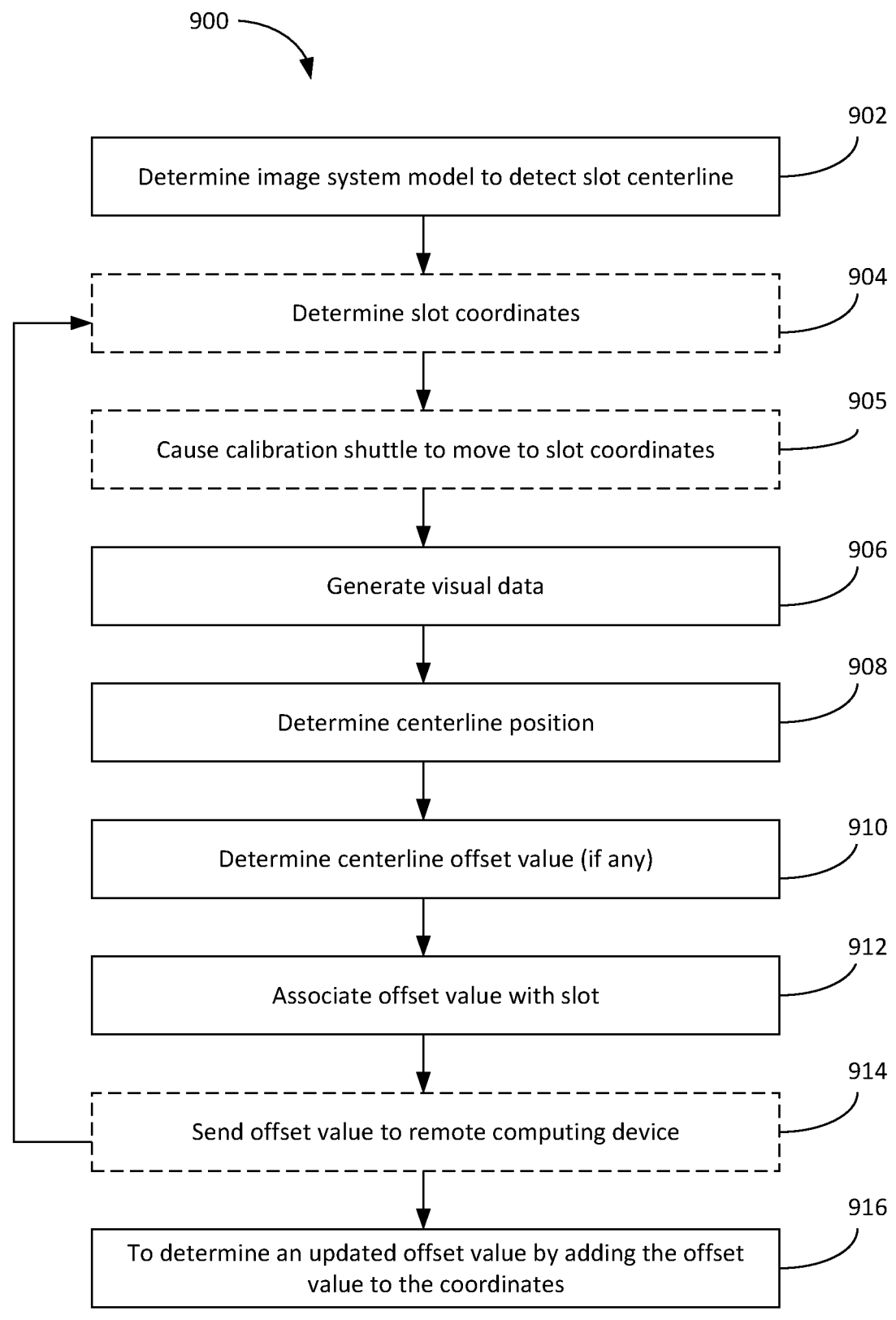

900

902
Determine image system model to detect slot centerline

904
Determine slot coordinates

905
Cause calibration shuttle to move to slot coordinates

906
Generate visual data

908
Determine centerline position

910
Determine centerline offset value (if any)

912
Associate offset value with slot

914
Send offset value to remote computing device

916
To determine an updated offset value by adding the offset value to the coordinates

FIG. 9

SYSTEMS AND METHODS FOR CALIBRATION OF A SHUTTLE SORTATION SYSTEM

BACKGROUND

As users increasingly make online purchases, fulfillment of such purchases and other orders become increasingly complicated. For example, a fulfillment center may have output of upwards of one million packages per day. With such demands, efficiency of logistics related to processing orders and distributing packages is of high importance. To achieve efficient distribution and sortation and ultimately fulfillment of such orders, often a various conveyor, roller, chute, and/or shuttle systems are used throughout a fulfillment center to distribute items and/or packages.

Recently, shuttles have been used move items and packages throughout such fulfillment centers. However, shuttles require precise coordinates and spatial awareness to accurately and safely move about such facilities, and often lack the precision required to maneuver and deposit items and packages in narrow or tight spaces. Accordingly, improvements in shuttle based systems for maneuvering shuttles and depositing packages with precision may be desired.

BRIEF DESCRIPTION OF THE DRAWINGS

FIG. 9 is an exemplary process flow for generating offset values using the calibration shuttle, in accordance with one or more embodiments of the disclosure.

Figure 1:
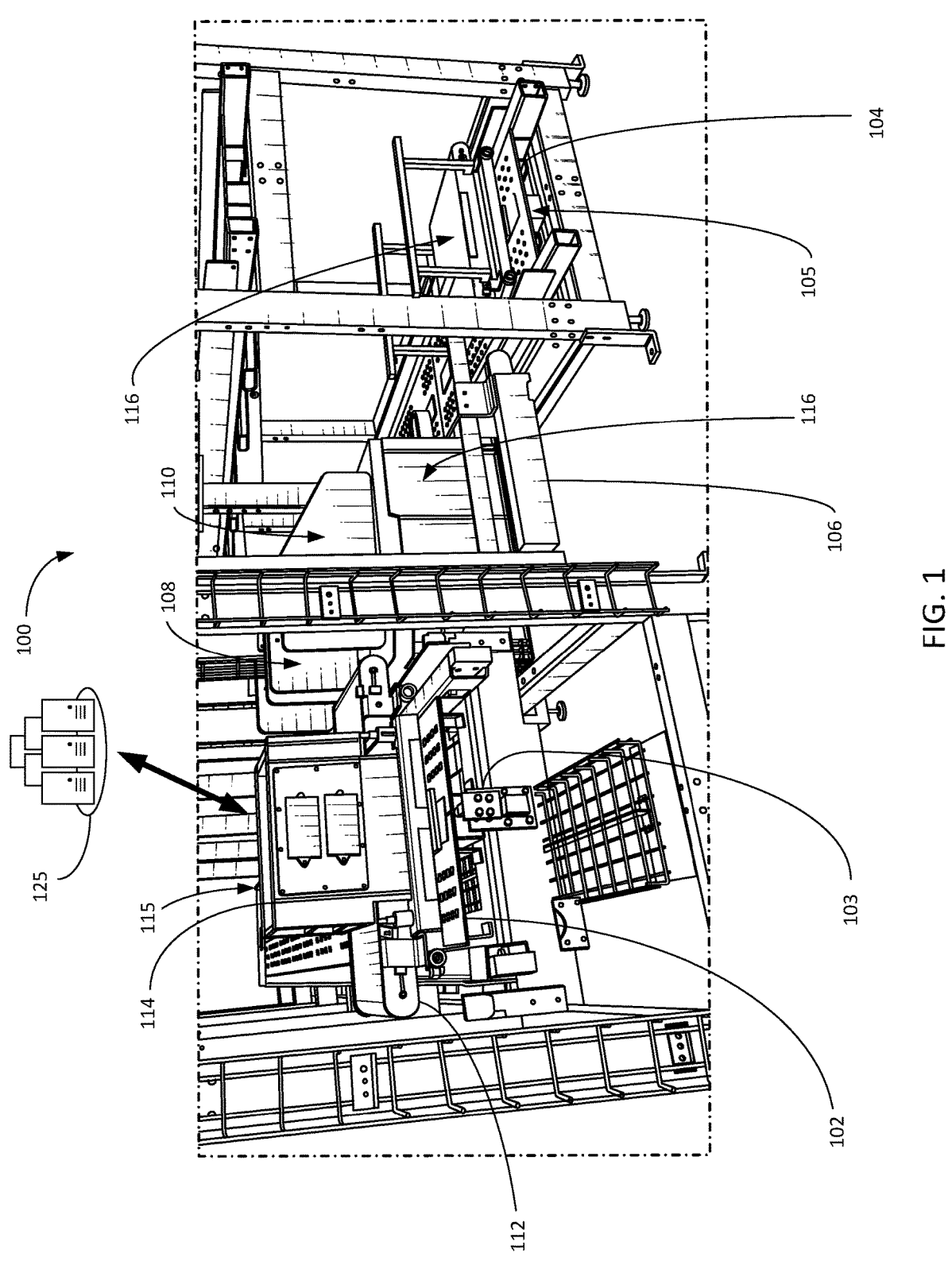
FIG. 1 is a schematic illustration of an a shuttle sortation system with a track, a shuttle on the track, and tote receiving areas, in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming. It is understood that a fulfillment center may alternatively be a sorting center and/or a shipping/delivery center.

To efficiently and safely sort products and/or items in such a facility, a shuttle sortation system is provided herein. The shuttle sortation system may include tracks having linear synchronous motors (LSMs) designed to propel shuttles along the tracks. For example, an item track may be positioned adjacent to tote receiving areas on either side of the item track, each tote receiving area designed to hold or support a tote for receiving one or more items or packages. A shuttle may move along the item track to deposit one or more items or packages into a tote. A tote track may be positioned next to a series of tote receiving areas and may similarly include linear synchronous motors for propelling a shuttle along the tote track for retrieving and/or transporting a tote.

To efficiently and accurately align shuttles on the item track and/or tote track with the tote receiving areas, a calibration shuttle may move along each track to determine precise coordinates accounting for small differences in machine and manufacture tolerances in the shuttle sortation system. The calibration shuttle may include imaging systems for generating images at known coordinates of each tote receiving area and using a calibration model and/or template to determine a offset value equal to the amount calibration shuttle is offset from the centerline of the tote receiving area. The coordinates for that tote receiving area may be adjusted based on the offset value.

Referring now to FIG. 1, is a schematic illustration of a shuttle sortation system with an item track, a tote track, a shuttle on the item track, a shuttle on the tote track, tote receiving areas, and a remote computing device is depicted, in accordance with one or more embodiments of the disclosure. As shown in FIG. 1, shuttle sortation system 100 may include one or more item tracks 102 and one or more tote tracks 104. Tote receiving areas 106 may be positioned between each item track and tote track. Shuttle sortation system 100 may further include remote computing device 125, which may be any suitable computing device (e.g., a remote server) having a processor, memory, and optionally a display and may communicate with each shuttle wirelessly.

Item track 102 and/or tote track 104 may have a flat surface along which a shuttle may move along and may also have linear synchronous motors below the flat surface for interfacing with the shuttles and designed to cause the shuttles to move along the respective track. For example, item track 102 may include linear synchronous motor 103 and/or tote track 104 may include linear synchronous motor 105. The linear synchronous motor may be any suitable linear synchronous motor using electromagnetism to cause a shuttle with a magnetic or ferrous portion to interact with a magnetic field generated by the linear synchronous motor to move the shuttle along the track.

As shown in FIG. 1, shuttle 115 may move along item track 102 and may include base 112 and item holder 114. Base 112 may be designed to move along item track 102 with low friction. Item holder 114 may be designed to hold one or more item and may include doors or gates for selectively depositing an item or package into tote 116, which may be waiting in tote receiving area 106. Tote 116 may be any suitable bin, box, or other storage structure. Base 112 may include one or more magnetic (e.g., permanent magnets) or ferrous portion and/or may include a conveyor.

To move an item (e.g., product) and/or package (e.g., box, bag, pouch, etc.) throughout the facility, such item may be placed in or on shuttle 115 (e.g., in item holder 114) and remote computing device 125 may cause linear synchronous motor 103 to move shuttle 115 to a destination for depositing such item and/or package, such as tote receiving area 106. For example, remote computing device 125 may communicate coordinates to linear synchronous motor 103 and/or shuttle 115 to cause shuttle move to the location the coordinates.

In one example, the coordinates may corresponding to units of measurement along a track from an origin point (e.g., 10 meters and 10 millimeters from origin "X"). Remote computing device 125 may maintain coordinates for each tote receiving area along item track 103 and/or tote track 105. Each coordinate may correspond to a location that should be at a centerline of a tote receiving area between dividers of the tote receiving area (e.g., divider 108 and divider 110). In this manner, moving shuttle 115 based on the coordinates should, in theory, cause shuttle 115 to traverse track 103 to a respective tote receiving area and should align shuttle 115 with a centerline of tote receiving area 116.

Once shuttle 115 is aligned with a centerline of tote receiving 106, shuttle 115 may deposit an item or package between dividers 108 and 110 and into tote 116 positioned in tote receiving area 106. Once tote 116 is filed with a pre-determined number of items and/or packages, tote 116 may be positioned onto tote shuttle 116, which may be similar to shuttle 115 but may be designed to transport totes along tote track 105.

Tote shuttle 116 may similarly be moved along tote track 105 to align tote shuttle with certain tote receiving areas 106 based on certain coordinates known by remote computing device 125, for example. While only one tote track and one set of tote receiving areas is illustrated in FIG. 1, it is understood that a second tote track may be positioned on the other side of item track 103 with a second set of tote receiving areas.

Figure 2:
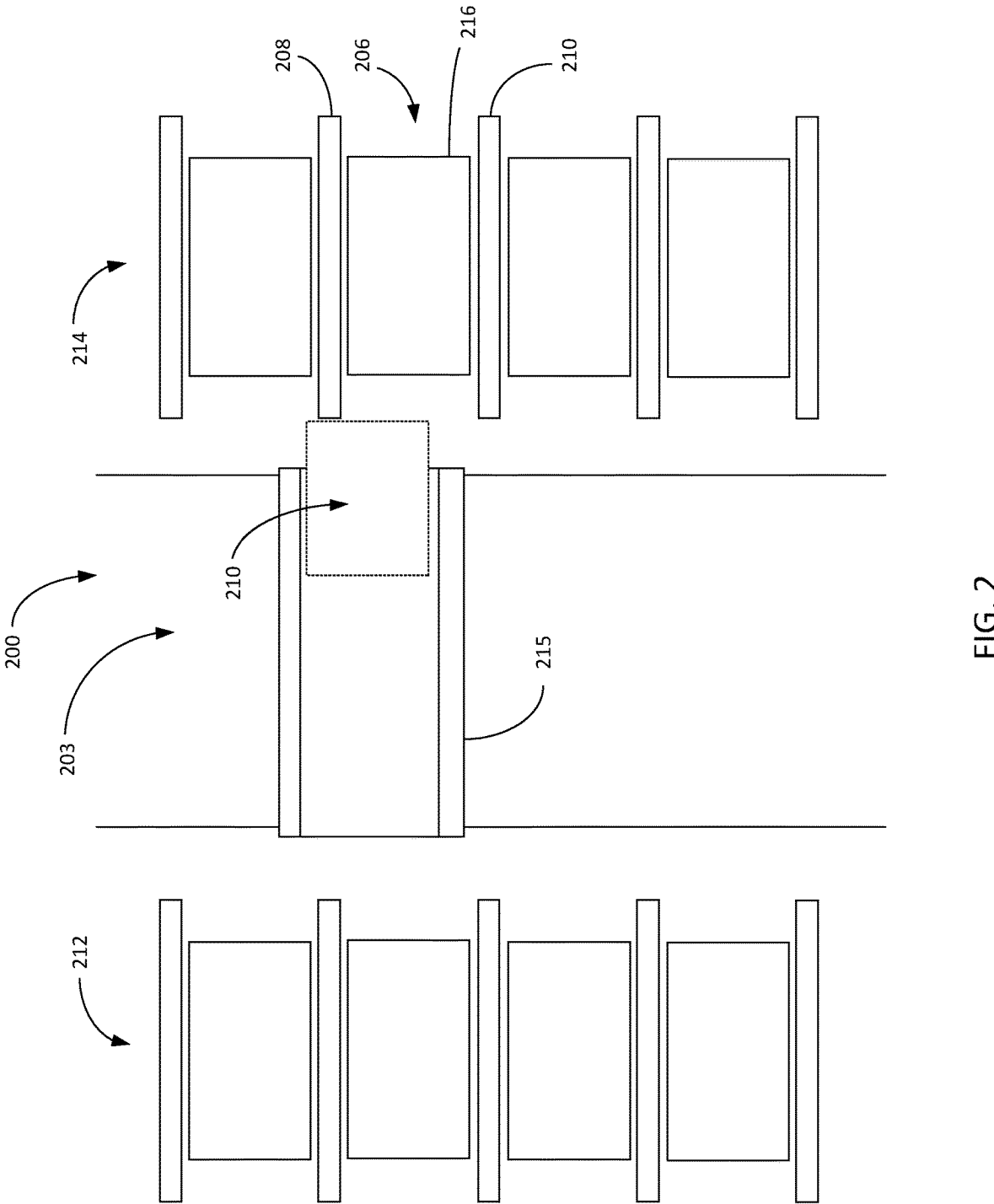
FIG. 2 is a schematic illustration of a shuttle sortation system with a track positioned between two sets of tote receiving areas, in accordance with one or more embodiments of the disclosure.

Referring now to FIG. 2, a schematic illustration of a shuttle sortation system with a track positioned between two sets of tote receiving areas is depicted, in accordance with one or more embodiments of the disclosure. Specifically, shuttle sortation system 200 may be the same as or similar to shuttle sortation system 100 of FIG. 1. Shuttle sortation system 200 may include item track 203 which may be the same as or similar to item track 103 of FIG. 1 and may also include shuttle 215, which may be the same as or similar to shuttle 115 of FIG. 1.

Tote receiving areas 212 may be positioned on one side of item track 203 and tote receiving areas 214 may be positioned on another side of item track 214, as shown in FIG. 2. Tote receiving areas 212 and/or tote receiving areas 214 may include a set of tote receiving areas arranged in series and positioned adjacent to track 203. For example, tote receiving area 206 may be included in tote receiving areas 214 and may be defined by divider 208 at one end and divider 210 at another end. Dividers 208 and/or 210 may be vertical dividers or separaters for separating tote receiving areas. Tote 216 may be positioned between the dividers Shuttle 215 may be tasked with transporting item 210 to tote receiving area 216, for example. As shown in FIG. 2, coordinates for tote receiving area 216 may be inaccurate and may cause tote 210 to interface with divider 208 for example. In this case, coordinates for tote receiving area 216 must be updated such that shuttle 215 is advanced further along track 203 toward divider 210 such that a center of shuttle 215 is aligned with a centerline of tote receiving area 206.

Figure 3:
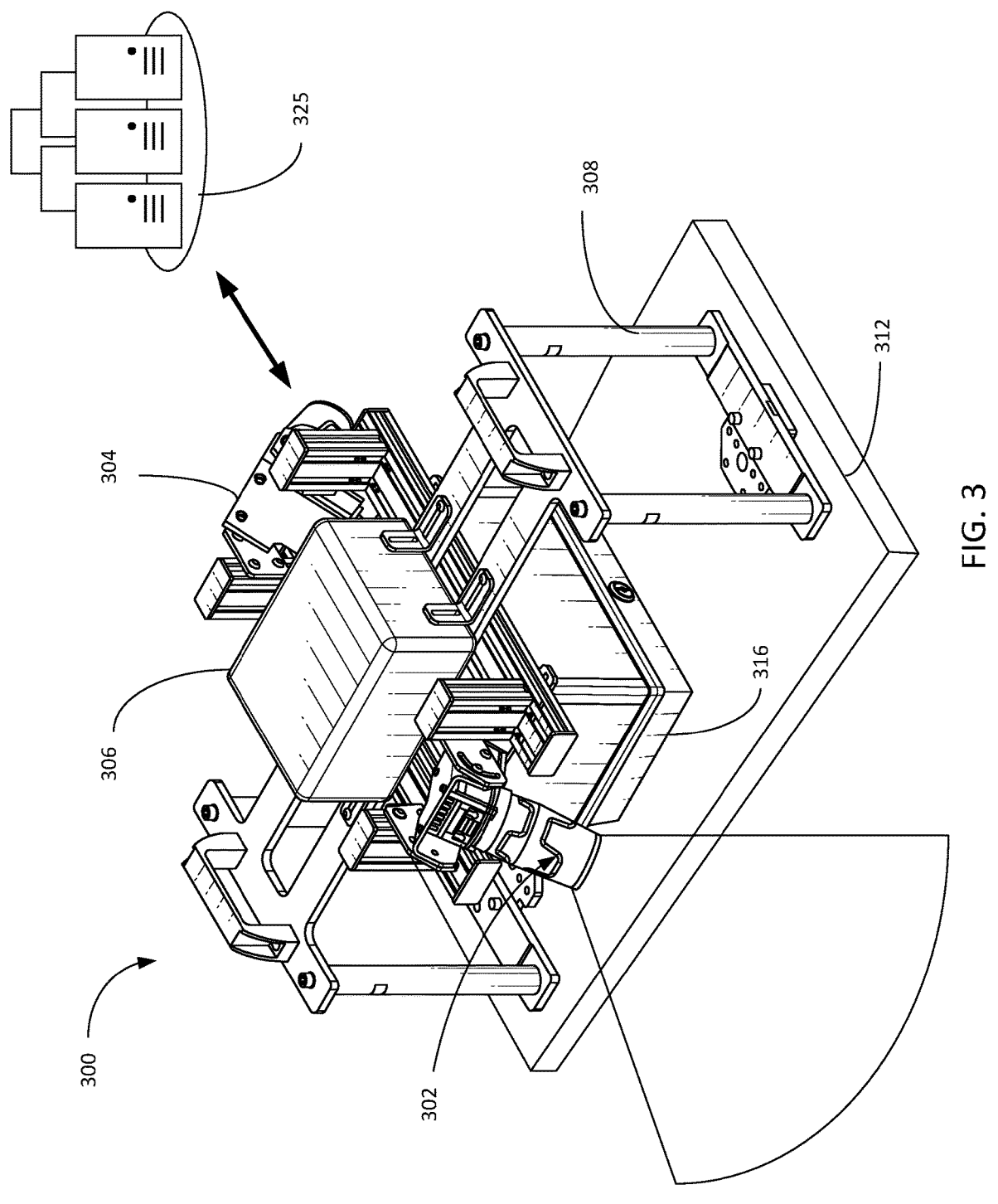
FIG. 3 is a schematic illustration a calibration shuttle in communication with a remote computing device, in accordance with one or more embodiments of the disclosure.

Referring now to FIG. 3, a schematic illustration of a calibration shuttle in communication with a remote computing device is depicted, in accordance with one or more embodiments of the disclosure. For example, calibration shuttle 300 may include base 312 which may be the same as or similar to base 112 of FIG. 1 and may be designed to traverse an item track (e.g., item track 103 of FIG. 1) and/or tote track (e.g., tote track 105 of FIG. 1). Base 312 may include one or more permanent magnets and/or ferrous portions for interacting with a linear synchronous motor.

Support structure 308 may be connected to base 312 and may include one or more poles, rods, racks, and/or tracks, for example, for supporting imaging system 302, imaging system 304, power source 306, and/or computing device 316. Imaging system 302 and/or imaging system 304 may include one or more imaging sensor (e.g., camera such as a high definition camera), memory, processor, communication unit, and the like. Imaging system 302 and imaging system 304 may be oriented on base 312 such that they are facing opposite directions. Power source 306 may be any suitable battery and/or may power imaging system 302, imaging system 304, and/or computing device 316.

Computing device 316 may be optional and may be any suitable computing device having a processor and/or memory. Computing device 316 may be in wired or wireless communication with imaging system 302 and/or imaging system 304 or may be part of imaging system 302 and/or imaging system 304. Imaging system 302, imaging system 304, and/or computing device 316 may communicate with a remote computing device, which may be the same as or similar to remote computing device 325.

Figure 4:
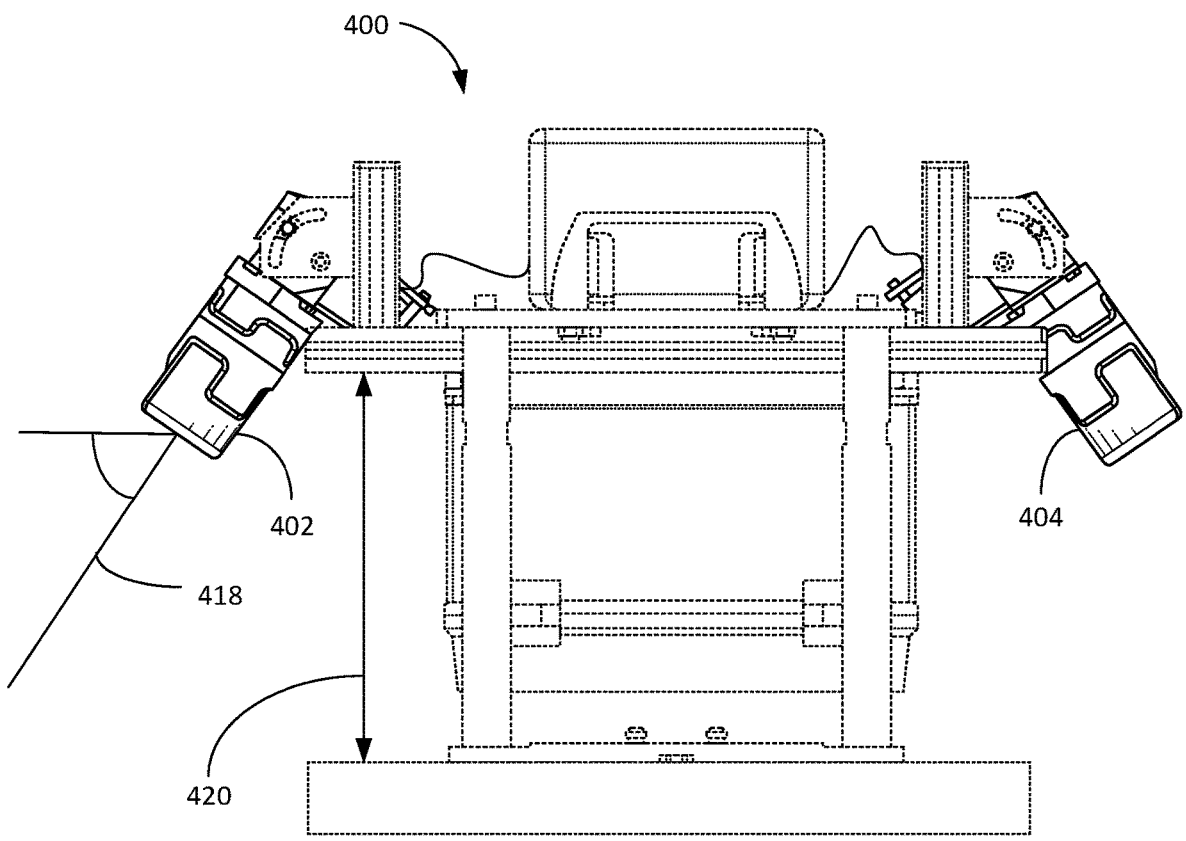
FIG. 4 is a schematic illustration of imaging systems and a power source of a calibration system, in accordance with one or more example embodiments of the disclosure.

Referring now to FIG. 4, calibration shuttle 400 is a schematic illustration of imaging systems and a power source of a calibration system, in accordance with one or more example embodiments of the disclosure. Calibration shuttle 400 may be the same as or similar to calibration 300 of FIG. 3. As shown in FIG. 4, imaging system 402 and imaging system 404 may be angled with respect to calibration shuttle 400. For example, imaging system 402 may be set at angle 418 and may also be set at height 418 from the base or track.

Imaging system 402 and/or imaging system 404 may be the same as or similar to imaging system 302 and/or imaging system 404 of FIG. 3 and may be positioned and/or oriented such that imaging system 402 and/or imaging system 404 may generate images of tote receiving areas adjacent to an item track or tote track. The images of the tote receiving areas may be generated at angle 418 and height 420, which may be used by imaging system 402 and/or imaging system 404 for calibration purposes.

Figures 5A, 5B:
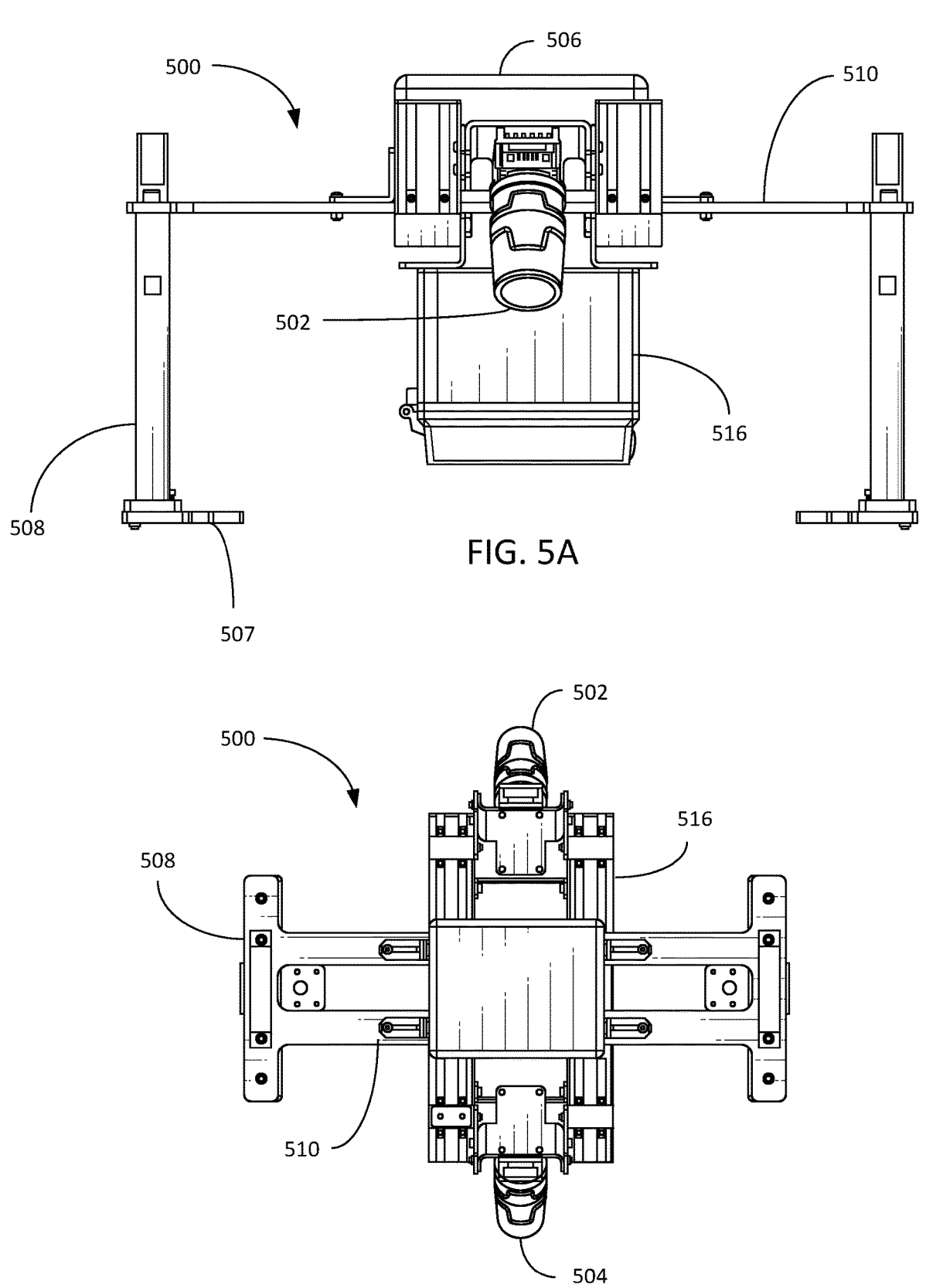
FIGS. 5A-5B are perspective illustrations the calibration structure, imagining systems, and power source, in accordance with one or more embodiments of the disclosure.

Referring now to FIGS. 5A-5B, side and top views of calibration rig of a calibration shuttle is illustrated, in accordance with one or more example embodiments of the disclosure. For example, calibration rig 500 may be designed to be positioned on and secured to a base of a calibration shuttle via attachment portion 507 which may extend from support structure 508, which may include support track 510 and/or may be the same as or similar to support structure 308 of FIG. 8.

Calibration rig 500 may include imaging system 502 and/or imaging system 504 which may be secured to secondary track 516 which may be positioned on and support track 510 at a set angle. Secondary track 516 may also support power source 506 and/or computing device 516. Computing device 516 may alternatively be supported by support track 510. It is understood that secondary track 510 may be adjustable with respect to support track 510.

Figure 6:
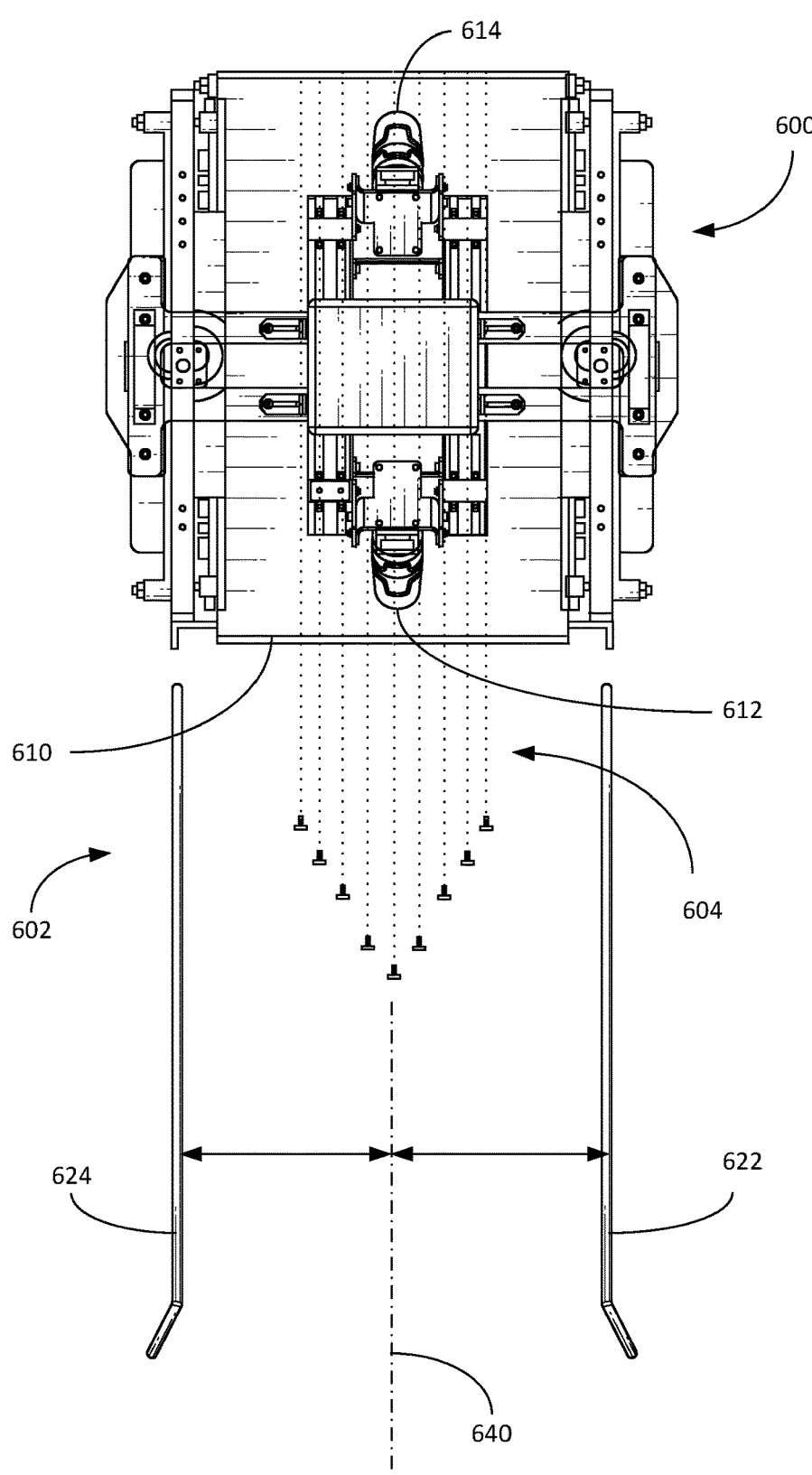
FIG. 6 is a schematic illustration of a calibration shuttle and a tote deposit area between dividers, in accordance with one or more embodiments of the disclosure.

Referring now to FIG. 6, calibration shuttle 600 is illustrated adjacent to tote receiving area 602. Calibration shuttle 600 may be the same as or similar to calibration shuttle 300 of FIG. 3. For example, calibration shuttle 600 may include base 610 and imaging systems 612 and 614. Base 610 may be the same as base 312 and imaging systems 612 and 614 may be the same as imaging systems 302 and 304 of FIG. 3

As shown in FIG. 6, calibration shuttle 604 may be used to generate a template image including spatial data 604 corresponding to tote receiving area 602. For example, an imaging processing model (e.g., neural network) which may run on either imaging device, a computing device on calibration shuttle 600 and/or on a remote computing device may be trained to detect divider 622 and/or divider 624 which may define tote receiving area 602. Calibration shuttle 600 may be positioned at centerline 640 of tote receiving area 602 to generate spatial data 604 and/or to generate a template image. For example, centerline may be equidistant between dividers 624 and 622.

Figure 7:
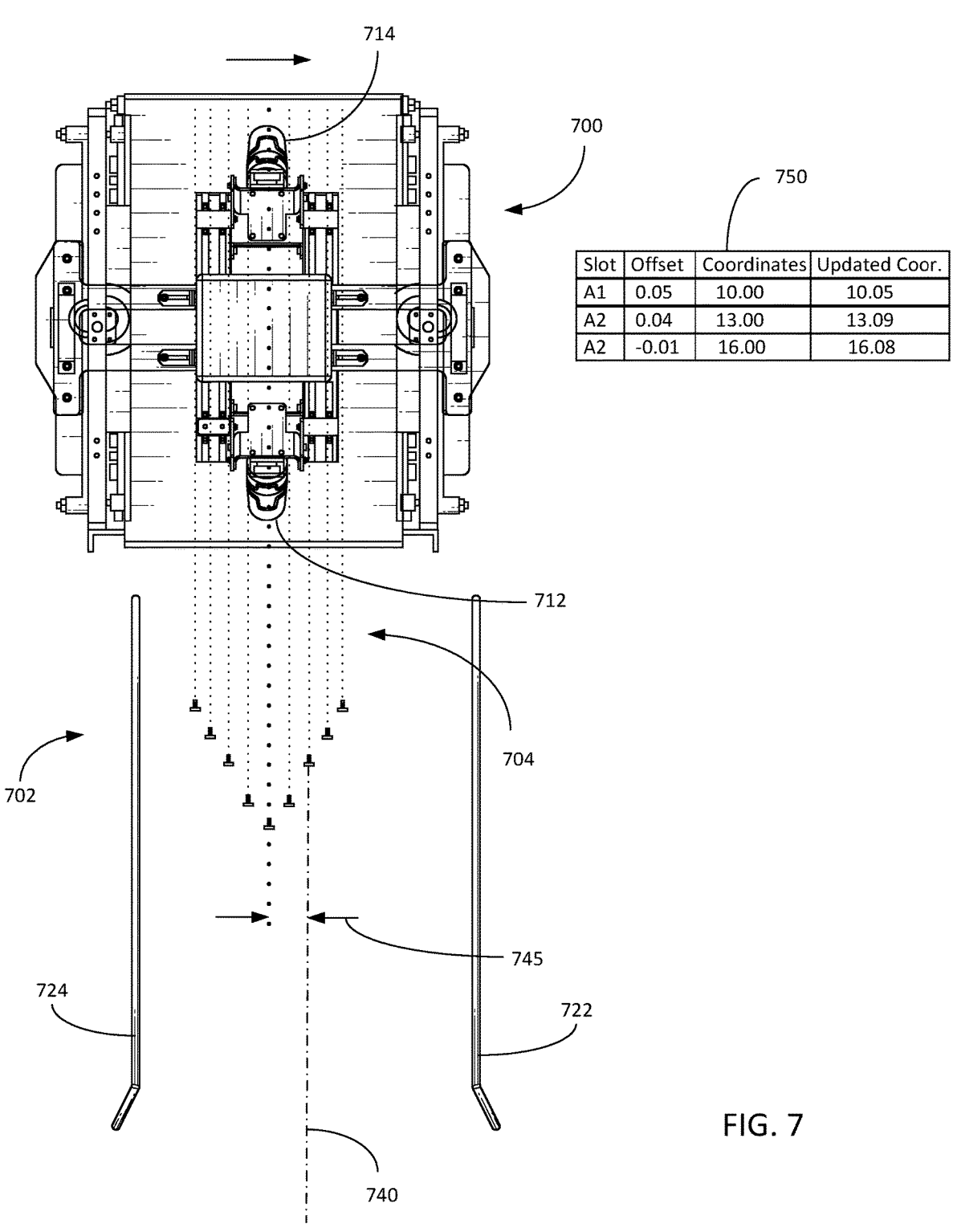
FIG. 7 is a schematic illustration of a calibration shuttle offset form a centerline of a tote deposit area, in accordance with one or more embodiments of the disclosure.

Referring now to FIG. 7, calibration shuttle 700 is illustrated adjacent to tote receiving area 702. Calibration shuttle 700 may be the same as or similar to calibration shuttle 600 of FIG. 6. For example, calibration shuttle 700 may include imaging systems 712 and 714, which may be the same as or similar to imaging systems 612 and 614 of FIG. 6. Calibration shuttle 700 may be caused to move to tote receiving area 702.

In one example, a remote computing device may maintain table 750, which may include coordinates for multiple different slots (e.g., tote receiving areas). For example, remote computing device may cause calibration shuttle 700 to move to coordinates 10.00 meters, which may correspond to slot A1 in table. As shown in FIG. 7, calibration shuttle 700 at coordinates 10.00 may not result in calibration shuttle 700 being perfectly aligned with a centerline of tote receiving area 702, corresponding to slot A1.

Figure 8:
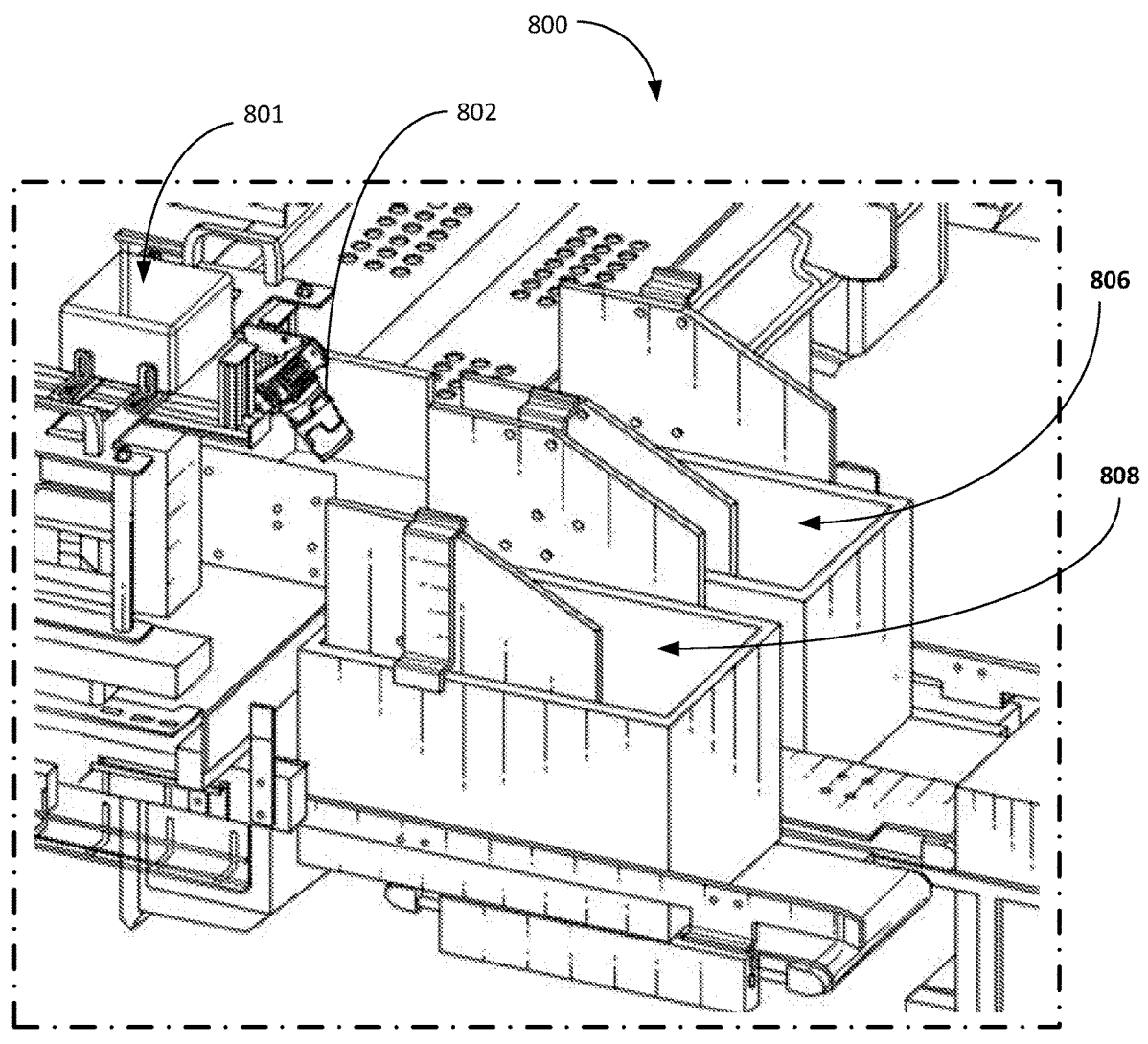
FIG. 8 is a schematic illustration of a calibration shuttle and a tote receiving area adjacent a track of the shuttle sortation system, in accordance with one or more embodiments of the disclosure in accordance with one or more embodiments of the disclosure.

As shown in FIG. 7, imaging system 712 may generate an image, which may include image data 704. Imaging system 712 may determine based on dividers 722 and 724, imaging data 704 and/or a template image that the coordinates cause calibration shuttle 700 to be offset from centerline 740. Based on image data 704, a positive or negative distance from centerline 740 may be determined, which may be referred to the offset or offset value. Imaging system 712 and/or 714 and/or the remote computing device may determine updated coordinates based on the coordinates and the offset value. Imaging system 712 and/or 714 may send the remote computing device the offset values for each slot and/or the update coordinates Referring now to FIG. 8, shuttle sortation system 800 is illustrated with calibration shuttle 801. Shuttle sortation system 800 may be the same as or similar to shuttle sortation system 100 of FIG. 1 and calibration shuttle 801 may be the same as or similar to calibration shuttle 300. As shown in FIG. 8, calibration shuttle 801 may cause the calibration shuttle to move along the item track to each slot or tote receiving area based on known coordinates for each slot or tote receiving area to determine whether such coordinates are accurate or should be updated based on an offset value.

In one example, calibration shuttle 801 may be caused to move along the item track to each tote receiving area to update the coordinates for each tote receiving area. For example calibration shuttle may start at tote receiving area 808 to determine if the coordinates align with a centerline of the tote receiving area and if not what the offset value is. Calibration shuttle 801 may then move to tote receiving 806 based on known coordinates for tote receiving area 806 and determine whether the coordinates align with a centerline of the tote receiving area and if not what the offset value.

While imaging system 802 is performing this calibration procedure an imaging system oriented in the opposite direction may simultaneously determine whether known coordinates for tote receiving areas on the other side of the item track align with the centerline and if not, what the offset value is. A similar procedure may be used with respect to the tote receiving areas along the tote track.

Referring now to FIG. 9, example process flow 900 for generating offset values using the calibration shuttle is depicted in accordance with one or more embodiments of the disclosure. To initiate process flow 900, at block 902 computer-executable instructions stored on a memory of a device, such as an imaging system and/or a remote computing device, may be executed to determine and/or train a model (e.g., machine learning model) to determine a centerline of a slot or tote receiving area (e.g., based on dividers). Such training may be based on a template of a calibration shuttle aligned with the tote centerline and/or calibration shuttle offset from the centerline by set amounts.

At optional block 904, computer-executable instructions stored on a memory of a device, such as an imaging system and/or a remote computing device, may be executed to determine slot or tote receiving coordinates. For example, a remote computing device may send such coordinates to the calibration shuttle. At optional block 905, computer-executable instructions stored on a memory of a device, such as an imaging system and/or a remote computing device, may be executed to cause the calibration shuttle to move to such coordinates. For example the remote computing device may cause an LSM to move the calibration shuttle.

At block 906, computer-executable instructions stored on a memory of a device, such as an imaging system and/or a remote computing device, may be executed to generate or determine visual data (e.g., image data) corresponding to the slot or tote receiving area. At block 908, computer-executable instructions stored on a memory of a device, such as an imaging system and/or a remote computing device, may be executed to determine a centerline position based on the image and optionally a trained model and/or a template.

At block 910, computer-executable instructions stored on a memory of a device, such as an imaging system and/or a remote computing device, may be executed to determine a centerline offset value, if any, based on the coordinates and the distance between a centerline of the calibration shuttle at the coordinates and a centerline of a corresponding tote receiving area. At block 912, computer-executable instructions stored on a memory of a device, such as an imaging system and/or a remote computing device, may be executed to determine associate the offset value with the coordinates of the tote receiving area (e.g., slot).

At optional block 914, computer-executable instructions stored on a memory of a device, such as an imaging system and/or a remote computing device, may be executed to send the offset value to a remote computing device (e.g., remote server). It is understood that block 916 may optionally be performed by the imaging system prior to block 914. Block 904 may be reinitiated for the next tote receiving area after block 914. At block 916, computer-executable instructions stored on a memory of a device, such as an imaging system and/or a remote computing device, may be executed to determine an updated offset value by adding the offset value to the coordinates.

Illustrative Computer Architecture

Figure 10:
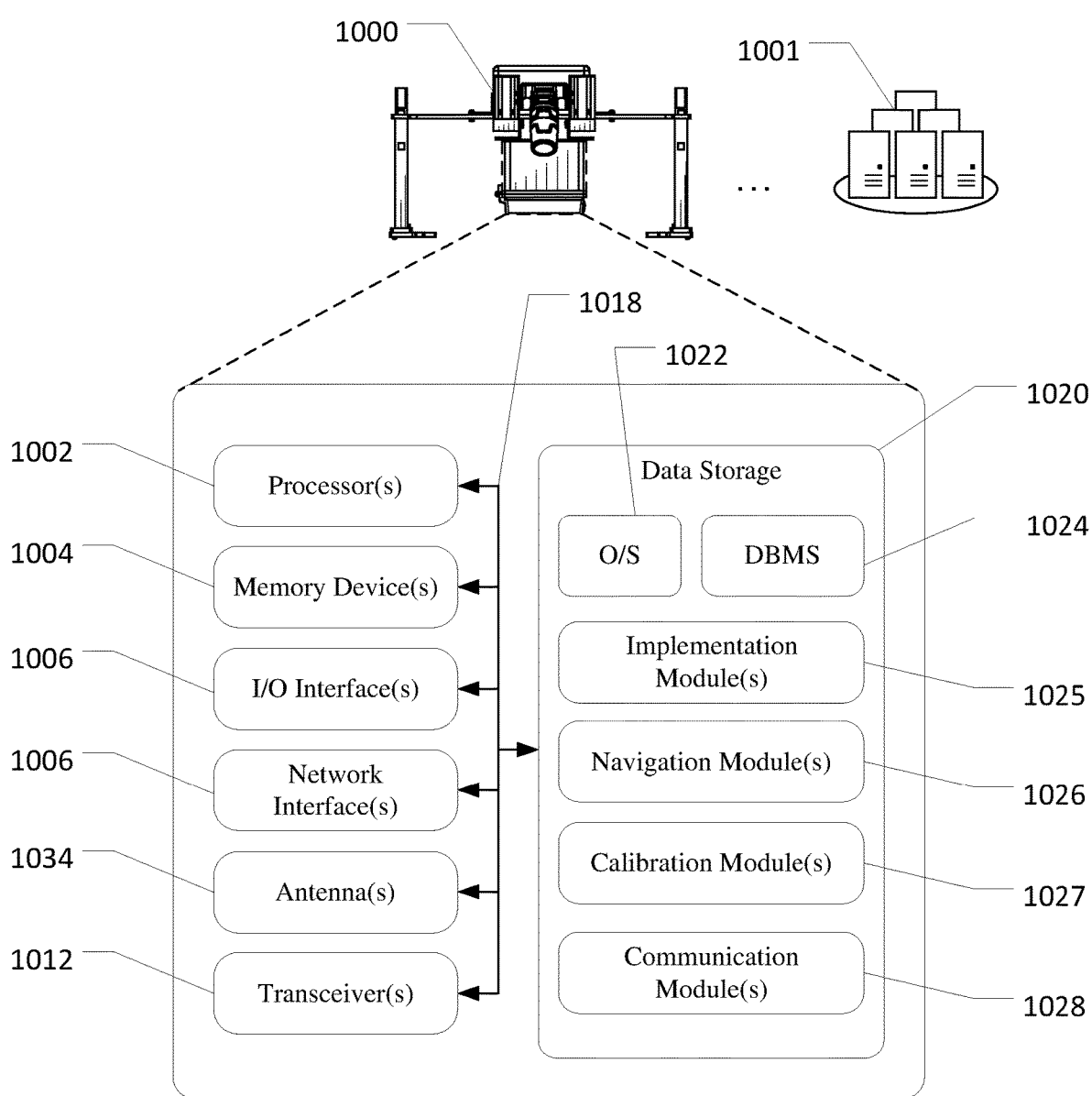
FIG. 10 schematically illustrates an example architecture of a calibration shuttle, in accordance with one or more embodiments of the disclosure.

FIG. 10 is a schematic block diagram of an illustrative imaging system 1000 of the shuttle sortation system for updating coordinates for item and/or tote shuttles. Imaging system 1000 may be the same as or similar to imaging system 302 and/or 304 of FIG. 3, for example. Imaging system 1000 may optionally be coupled to and/or communicate with devices including, but not limited to, computing devices, controllers, remote computing devices and/or one or more servers, or the like. It is understood that imaging system 1000 may instead be a computing device and/or remote computing device (e.g. remote computing device 1001) or the operations described herein may be performed by both imaging system 1000 and a computing device and/or remote computing device.

Imaging system 1000 may be configured to communicate via one or more networks with one or more servers, computing devices, conveyors, controllers, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the imaging system 1000 may include one or more processors (processor(s)) 1002, one or more memory devices 1004 (generically referred to herein as memory 1004), one or more input/output (I/O) interface(s) 1006, one or more network interface(s) 1008, one or more optional sensors or sensor interface(s), one or more transceivers 1012, one or more optional speakers, one or more optional microphones, and one or more antenna(s) 1034. The imaging system 1000 may further include one or more buses 1018 that functionally couple various components of the imaging system 1000. The imaging system 1000 may further include one or more antenna (e) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the imaging system 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the computing device may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more optional database management systems (DBMS) 1024; and one or more implementation module(s) 1025, one or more navigation module(s) 1026, one or more calibration module(s) 1027, and/or one or more communication module(s) 1028. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the imaging system 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, the datastore(s) may include, for example, user preference information, user contact data, device pairing information, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the imaging system 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the implementation module(s) 1025 may include computer-executable instructions, code, or the like that responsive to execution by one or more of the processor(s) 1002 may perform functions including, but not limited to, overseeing coordination and interaction between one or more modules and computer executable instructions in data storage 1020, determining actions and tasks from a remote computing device or controller, determining actions associated with user interactions, determining actions associated with user input, sending and receiving signals and/or data to and from one or more sensors, switches, electromagnets, LSMs, controllers, other computing devices, servers, datastores and the like, initiating commands locally or at remote computing devices and/or controllers, and the like.

Navigation module 1026 may include computer-executable instructions, code, or the like that responsive to execution by one or more of the processor(s) 1002 may perform functions including, but not limited to determining coordinates or a destination for a shuttle and/or a payload and determining a shuttle location with respect to a shuttle sortation system.

Calibration module 1027 may include computer-executable instructions, code, or the like that responsive to execution by one or more of the processor(s) 1002 may perform functions including, but not limited to controlling one or more imaging systems to generate images and/or process images using a calibration model to determine offsets at certain tote receiving areas.

The communication module(s) 1028 may include computer-executable instructions, code, or the like that responsive to execution by one or more of the processor(s) 1002 may perform functions including, but not limited to, communicating with one or more sensors, controllers, conveyor belts, conveyor systems, for example, via wired or wireless communication, communicating with electronic devices, communicating with one or more computing devices, servers (e.g., remote servers), communicating with remote datastores and/or databases, sending or receiving notifications or commands/directives, communicating with cache memory data, and the like.

The routing module 1029 may include computer-executable instructions, code, or the like that responsive to execution by one or more of the processor(s) 1002 may perform functions including, but not limited to, determining an optimal or desirable routing path to a downstream stations and/or locations (e.g., packaging station, sortation station, etc.). Routing module 1029 may further determine updated routing information based on updated information regarding an order, malfunction, delivery route, or the like, relating to the package, item, order, user account, etc. In one example, routing module 1029 may be responsible for load balancing when slowdowns and/or backups are identified in the fulfillment and/or sortation centers.

Referring now to other illustrative components depicted as being stored in the data storage 1020, the O/S 1022 may be loaded from the data storage 1020 into the memory 1004 and may provide an interface between other application software executing on the imaging system 1000 and hardware resources of the imaging system 1000. More specifically, the O/S 1022 may include a set of computer-executable instructions for managing hardware resources of the computing device 1000 and for providing common services to other application programs (e.g., managing memory allocation among various application programs). In certain example embodiments, the O/S 1022 may control execution of the other program module(s) to for content rendering. The O/S 1022 may include any operating system now known or which may be developed in the future including, but not limited to, any server operating system, any mainframe operating system, or any other proprietary or non-proprietary operating system.

The optional DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. As the imaging system 1000 is a mobile electronic device, the DBMS 1024 may be any suitable light-weight DBMS optimized for performance on a mobile device.

Referring now to other illustrative components of the imaging system 1000, the optional input/output (I/O) interface(s) 1006 may facilitate the receipt of input information by the imaging system 1000 from one or more I/O devices as well as the output of information from the imaging system 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the imaging system 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), Fire Wire, Thunderbolt, Ethernet port or other connection protocol that may connect to one or more networks. The I/O interface(s) 1006 may also include a connection to one or more of the antenna (e) 1034 to connect to one or more networks via a wireless local area network (WLAN) (such as Wi-Fi®) radio, Bluetooth, Zig-Bee, and/or a wireless network radio, such as a radio capable of communication with a wireless communication network such as a Long Term Evolution (LTE) network, WiMAX network, 3G network, ZigBee network, etc.

The imaging system 1000 may further include one or more network interface(s) 1008 via which the imaging system 1000 may communicate with any of a variety of other systems, platforms, networks, devices, and so forth. The network interface(s) 1008 may enable communication, for example, with one or more wireless routers, one or more host servers, one or more web servers, and the like via one or more of networks.

The antenna (e) 1034 may include any suitable type of antenna depending, for example, on the communications protocols used to transmit or receive signals via the antenna (e) 1034. Non-limiting examples of suitable antennas may include directional antennas, non-directional antennas, dipole antennas, folded dipole antennas, patch antennas, multiple-input multiple-output (MIMO) antennas, or the like. The antenna (e) 1034 may be communicatively coupled to one or more transceivers 1012 or radio components to which or from which signals may be transmitted or received.

As previously described, the antenna (e) 1034 may include a Bluetooth antenna configured to transmit or receive signals in accordance with established standards and protocols, such as Bluetooth and/or BLE. Alternatively, or in addition to, antenna (e) 1034 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna (c) 1034 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g. 802.11n), 5 GHZ channels (e.g., 802.11n, 802.11ac), or 60 GHz channels (e.g., 802.11ad). In alternative example embodiments, the antenna (e) 1034 may be configured to transmit or receive radio frequency signals within any suitable frequency range forming part of the unlicensed portion of the radio spectrum (e.g., 900 MHz).

The antenna (c) 1034 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna (e) 1034—transmitting or receiving radio frequency (RF) signals in the bandwidth and/or channels corresponding to the communications protocols utilized by the imaging system 1000 to communicate with other devices. The transceiver(s) 1012 may include hardware, software, and/or firmware for modulating, transmitting, or receiving—potentially in cooperation with any of antenna (e) 1034—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the imaging system 1000. The transceiver(s) 1012 may further include a low noise amplifier (LNA), additional signal amplifiers, an analog-to-digital (A/D) converter, one or more buffers, a digital baseband, or the like.

The optional sensor(s)/sensor interface(s) 1010 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth. Sensor(s)/sensor interface(s) 1010 may additionally, or alternatively, include health related sensors such as electrocardiogram (ECG) sensors, glucose sensors, heartrate sensors, temperature sensors, and the like. The optional speaker(s) may be any device configured to generate audible sound. The optional microphone(s) may be any device configured to receive analog sound input or voice data, and may include noise cancellation functionality.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the imaging system 1000 and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the imaging system 1000 may include alternate and/or additional hardware, software, or firmware components beyond those described or depicted without departing from the scope of the disclosure. More particularly, it should be appreciated that software, firmware, or hardware components depicted as forming part of the imaging system 1000 are merely illustrative and that some components may not be present or additional components may be provided in various embodiments. While various illustrative program module(s) have been depicted and described as software module(s) stored in data storage 1020 it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for case of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more exemplary embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
   a base configured to interface with a linear synchronous motor to move along a track, the track adjacent to a first set of tote receiving areas on a first side and a second set of tote receiving areas on a second side, each tote receiving area of the first set of tote receiving areas and the second set of tote receiving areas defined by dividers;
   a support structure rigidly coupled to the base;
   a first imaging system coupled to the support and oriented in a first direction with respect to the base such that the first imaging system is configured to image the first set of tote receiving areas;
   a second imaging system coupled to the support and oriented in a second direction opposite the first direction such that the second imaging system is configured to image the second set of tote receiving areas, the second imaging system having memory configured to store computer-executable instructions, and at least one computer processor configured to access the memory and execute computer-executable instructions to:
      determine a calibration model corresponding to a tote receiving area;
      determine coordinates for a second tote receiving area of the second set of tote receiving areas;
      generate an image at the second tote receiving area;
      determine, based on the image of the second tote receiving area and the model, a position the base with respect to a first divider and a second divider of the second tote receiving area;
      determine an offset value based on the position of the base with respect to the first divider and the second divider; and
      associate the offset value with the coordinates for the second tote receiving area.

2. The system of claim 1, wherein the first imaging system has second memory configured to store second computer-executable instructions, and at least one second computer processor configured to access the second memory and execute the second computer-executable instructions to:
   determine the calibration model;
   determine second coordinates for a third tote receiving area of the first set of tote receiving areas;
   generate a second image at the third tote receiving area;
   determine, based on the second image of the third tote receiving area and the model, a second position the base with respect to a third divider and a fourth divider of the third tote receiving area;
   determine a second offset value based on the second position of the base with respect to the third divider and the fourth divider; and
   associate the offset value with the coordinates for the second tote receiving area.

3. The system of claim 1, wherein at the least one computer processor of the second imaging system is further configured to determine updated coordinates for the second tote receiving area based on the offset value and the coordinates.

4. The system of claim 1, wherein at the least one computer processor of the second imaging system is further configured to access the memory and execute the computer-executable instructions to send the offset value associated with the coordinates to a remote computing device.

5. A system comprising:
   a base configured to interface with a linear synchronous motor to move along a track, the track adjacent to a set of tote receiving areas positioned along the track;
   an imaging system secured to the base and oriented such that the imaging system is configured to image the set of tote receiving areas, the imaging system having memory configured to store computer-executable instructions, and at least one computer processor configured to access the memory and execute the computer-executable instructions to:

determine a model trained to determine a centerline of a tote receiving area;

generate an image at a second tote receiving area of the set of tote receiving areas, the image indicative of the second tote receiving area including first divider and a second divider of the second tote receiving area;

determine, based on the image of the second tote receiving area and the model, a position of the base with respect to the first divider and the second divider; and determine an offset value based on the position of the base with respect to the first divider and the second divider.

6. The system of claim 5, wherein at the least one computer processor of the imaging system is further configured to:

determine coordinates for the second tote receiving area; and associate the offset value with the coordinates for the second tote receiving area.

7. The system of claim 6, wherein at the least one computer processor of the imaging system is further configured to determine updated coordinates for the second tote receiving area based on the offset value and the coordinates.

8. The system of claim 7, wherein at the least one computer processor of the imaging system is further configured to send a remote computing device the updated coordinates for the second tote receiving area.

9. The system of claim 6, wherein at the least one computer processor of the imaging system is further configured to access the memory and execute the computer-executable instructions to send the offset value associated with the coordinates to a remote computing device.

10. The system of claim 5, further comprising:

a support structure coupled to the base and configured to support the imaging system; and a power source coupled to the support structure and configured to power the imaging system, wherein the imaging system comprises a high definition camera.

11. The system of claim 5, wherein the track is adjacent to a first set of tote receiving areas on a first side of the track and a second set of tote receiving areas on a second side, and each tote receiving area of the first set of tote receiving areas and the second set of tote receiving areas is separated by a divider.

12. The system of claim 11, wherein the imaging system is oriented in a first direction with respect to the base such that the imaging system is configured to image the first set of tote receiving areas, the system further comprising:

a second imaging system secured to the base and oriented in a second direction opposite the first direction such that the second imaging system is configured to image the second set of tote receiving areas, the second imaging system having second memory configured to store second computer-executable instructions, and at least one second computer processor configured to access the second memory and execute the second computer-executable instructions to:

determine the model;

generate a second image at a third tote receiving area, the second image indicative of the third tote receiving area including third divider and a fourth divider of the third tote receiving area;

determine, based on the second image of the third tote receiving area and the model, a second position of the base with respect to the third divider and the fourth divider; and determine a second offset value based on the second position of the base with respect to the third divider and the fourth divider.

13. A method comprising:

determining a model trained to determine a centerline of a tote receiving area;

determining the imaging system is positioned adjacent to a second tote receiving area of a set of tote receiving areas positioned along a track, the imaging system positioned on a shuttle adapted to traverse the track;

generating an image at the second tote receiving area, the image indicative of the second tote receiving area and including a first divider and a second divider defining the second tote receiving area;

determining, based on the image of the second tote receiving area and the model, a position of the shuttle with respect to the first divider and the second divider; and determine an offset value based on the position of the shuttle with respect to the first divider and the second divider.

14. The method of claim 13, wherein the track causes the shuttle to move to the second tote receiving area via a linear synchronous motor.

15. The method of claim 13, further comprising:

determining coordinates for the second tote receiving area; and associating the offset value with the coordinates for the second tote receiving area.

16. The method of claim 15, further comprising determining updated coordinates for the second tote receiving area based on the offset value and the coordinates.

17. The method of claim 16, further comprising sending a remote computing device the updated coordinates for the second tote receiving area.

18. The method of claim 15, further comprising sending the offset value associated with the coordinates to a remote computing device.

19. The method of claim 13, wherein imaging system comprises at least one computing device having a processor and at least one high definition camera.

20. The method of claim 13, further comprising:

determining, by a second imaging system positioned on the shuttle, the model;

determining the second imaging system is positioned adjacent to a third tote receiving area of a second set of tote receiving areas positioned along a track;

generating a second image at the third tote receiving area, the second image indicative of the third tote receiving area and including a third divider and a fourth divider defining the third tote receiving area;

determining, based on the second image of the third tote receiving area and the model, a second position of the shuttle with respect to the third divider and the fourth divider; and determining a second offset value based on the second position of the shuttle with respect to a third divider and the fourth divider.

* * * * *